United States Patent
Sato

(10) Patent No.: US 12,305,723 B2
(45) Date of Patent: May 20, 2025

(54) CALIPER FOR OPPOSED PISTON TYPE DISC BRAKE

(71) Applicant: AKEBONO BRAKE INDUSTRY CO., LTD., Tokyo (JP)

(72) Inventor: Takuhiko Sato, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 403 days.

(21) Appl. No.: 17/720,357

(22) Filed: Apr. 14, 2022

(65) Prior Publication Data

US 2022/0341476 A1  Oct. 27, 2022

(30) Foreign Application Priority Data

Apr. 26, 2021 (JP) ................................ 2021-074341

(51) Int. Cl.
*F16D 55/228* (2006.01)
*F16D 55/00* (2006.01)

(52) U.S. Cl.
CPC .... *F16D 55/228* (2013.01); *F16D 2055/0016* (2013.01)

(58) Field of Classification Search
CPC .......... F16D 55/228; F16D 2055/0016; F16D 65/0068; F16D 55/22; F16D 65/095; F16D 2121/04
See application file for complete search history.

(56) References Cited

U.S. PATENT DOCUMENTS

| | | | |
|---|---|---|---|
| 2016/0208872 A1* | 7/2016 | Morio | .................... F16D 55/228 |
| 2019/0316641 A1 | 10/2019 | Morio | |
| 2019/0383336 A1 | 12/2019 | Noguchi et al. | |
| 2020/0393007 A1 | 12/2020 | Barale et al. | |

(Continued)

FOREIGN PATENT DOCUMENTS

| | | |
|---|---|---|
| CN | 110088495 A | 8/2019 |
| CN | 110608246 A | 12/2019 |
| CN | 112005028 A | 11/2020 |

(Continued)

OTHER PUBLICATIONS

Japanese Patent No. JP 2014109317 to Miyahara et al. published on Jun. 12, 2014.*

(Continued)

*Primary Examiner* — Pamela Rodriguez
(74) *Attorney, Agent, or Firm* — Faegre Drinker Biddle & Reath LLP

(57) ABSTRACT

There is provided a caliper for an opposed piston type disc brake including: an inner body including a pair of attachment boss portions; an outer body; and a pair of side bridges connecting, in the axial direction, end portions of the inner body on both outer sides in the circumferential direction and end portions of the outer body on both outer sides in the circumferential direction. At least one of the pair of side bridges includes a concave portion extending in the axial direction and opening to an outer surface of the side bridge, and a first beam portion and a second beam portion disposed so as to sandwich the concave portion from both sides, end portions of the respective first beam portion and the second beam portion on the inner side in the axial direction being connected to the attachment boss portions.

14 Claims, 11 Drawing Sheets

(56) References Cited

U.S. PATENT DOCUMENTS

2021/0088090 A1     3/2021    Shiraishi

FOREIGN PATENT DOCUMENTS

| | | |
|---|---|---|
| CN | 112313425 A | 2/2021 |
| EP | 2 169 253 A1 | 3/2010 |
| EP | 3 470 700 A1 | 4/2019 |
| JP | 2004-239279 A | 8/2004 |
| JP | 4028405 B2 | 12/2007 |
| JP | 2010-078055 A | 4/2010 |
| JP | 2017-172611 A | 9/2017 |
| JP | 6656756 B2 | 3/2020 |
| JP | 2021-021429 A | 2/2021 |

OTHER PUBLICATIONS

European Patent No. EP 2775160 to Nanri published on Sep. 10, 2014.*
Japanese Office Action issued Jun. 25, 2024 in Application No. 2021-074341.
Extended European Search Report issued Jul. 26, 2022 in European Patent Application No. 22163825.7.
The First Office Action issued on Mar. 1, 2025 for corresponding Chinese patent application No. 202210440796.7.

* cited by examiner

CALIPER FOR OPPOSED PISTON TYPE DISC BRAKE

CROSS-REFERENCE TO RELATED APPLICATIONS

This application is based on Japanese Patent Application No. 2021-074341 filed on Apr. 26, 2021, the contents of which are incorporated herein by way of reference.

TECHNICAL FIELD

The present invention relates to a caliper constituting an opposed piston type disc brake device.

BACKGROUND

A disc brake device is widely used to brake an automobile. At the time of braking by the disc brake device, a pair of pads disposed on both sides of a rotor rotating together with a wheel in an axial direction are pressed against both side surfaces of the rotor in the axial direction by pistons. As such a disk brake device, disk brake devices having various structures have been known in the related art, but an opposed piston type disc brake device having pistons on both sides of a rotor in an axial direction can obtain a stable braking force, and therefore, usage examples have been increased in recent years.

As described in, for example, JP-A-2010-78055 (Patent Literature 1), an opposed piston type disc brake device includes a caliper that is disposed so as to cover a rotor rotating together with a wheel from a radially outer side and that is fixed to a vehicle body, and a pair of pads that are disposed on both sides of the rotor in an axial direction and that are supported so as to be movable in the axial direction with respect to the caliper.

The caliper includes an inner body disposed on an inner side of the rotor in the axial direction, an outer body disposed on an outer side of the rotor in the axial direction, and a pair of side bridges that are disposed so as to cover the rotor from the radially outer side and that connects end portions of the inner body on both outer sides in a circumferential direction and end portions of the outer body on both outer sides in the circumferential direction.

The inner body includes an inner cylinder portion that is open on an outer side surface facing the rotor in the axial direction, and an inner piston is fitted to the inner cylinder portion. The inner body includes a pair of attachment boss portions for fixing the caliper to the vehicle body on both outer sides of the inner cylinder in the circumferential direction. The outer body includes an outer cylinder portion that is open on an inner side surface facing the rotor in the axial direction, and an outer piston is fitted to the outer cylinder portion.

At the time of braking, brake oil is fed from a master cylinder to each of the inner cylinder portion and the outer cylinder portion. Accordingly, the inner piston fitted to the inner cylinder portion is pushed out in the axial direction, and the pad supported by the inner body is pressed against an inner side surface of the rotor in the axial direction. Similarly, the outer piston fitted to the outer cylinder portion is pushed out in the axial direction, and the pad supported by the outer body is pressed against an outer side surface of the rotor in the axial direction. As a result, the rotor is strongly clamped by the pair of pads from both sides in the axial direction, and the vehicle is braked.

Patent Literature 1: JP-A-2010-78055

At the time of braking, the inner and outer pistons apply forces to the inner and outer bodies in directions away from each other in the axial direction as reactive forces to press the pair of pads against both side surfaces of the rotor in the axial direction. Therefore, when rigidity of the side bridges connecting the inner body and the outer body in the axial direction is not sufficient, the inner body and the outer body may be elastically deformed in directions away from each other, and a desired braking force may not be obtained.

On the other hand, since the disc brake device is provided on a road surface side with respect to a spring constituting a suspension device in the vehicle, the disc brake device becomes a so-called unsprung load. Therefore, it is required to achieve weight reduction for a purpose of improving fuel efficiency and traveling performance of the vehicle.

The present invention is made to solve the above-described problem and an object of the present invention is to provide a caliper for an opposed piston type disc brake that is capable of achieving both ensuring rigidity and the weight reduction.

SUMMARY

A caliper for an opposed piston type disc brake according to an aspect of the present invention includes an inner body, an outer body, and a pair of side bridges.

The inner body is disposed on an inner side of a rotor in an axial direction, and includes at least one inner cylinder portion and a pair of attachment boss portions disposed on both outer sides of the at least one inner cylinder portion in a circumferential direction. The pair of attachment boss portions each has a bolt insertion hole penetrating therethrough in a radial direction.

The outer body is disposed on an outer side of the rotor in the axial direction and includes at least one outer cylinder portion.

The pair of side bridges are disposed so as to cover the rotor from a radially outer side, and connect, in the axial direction, end portions of the inner body on both outer sides in the circumferential direction and end portions of the outer body on both outer sides in the circumferential direction.

In the caliper for an opposed piston type disc brake according to an aspect of the present invention, at least one of the pair of side bridges includes a concave portion extending in the axial direction and opening to an outer surface of the side bridge, and a first beam portion and a second beam portion disposed so as to sandwich the concave portion from both sides, end portions of the respective first beam portion and the second beam portion on the inner side in the axial direction being connected to the attachment boss portions directly or via portions of the side bridges located near the attachment boss portions.

In the caliper for the opposed piston type disc brake according to an aspect of the present invention, the concave portion can have an axial bottom portion at an end portion on the outer side in the axial direction.

In the caliper for the opposed piston type disc brake according to an aspect of the present invention, the concave portion can be open to an outer circumferential surface of the side bridge and/or an outer side surface of the side bridge in the circumferential direction.

In the caliper for the opposed piston type disc brake according to an aspect of the present invention, the concave portion can be open to an inner side surface of the side bridge in the axial direction.

In the caliper for the opposed piston type disc brake according to an aspect of the present invention, a ridgeline of the first beam portion can be connected to an end portion of the attachment boss portion on a radially inner side via a ridgeline of the portion of the side bridge located near the attachment boss portion.

In the caliper for the opposed piston type disc brake according to an aspect of the present invention, the second beam portion can be directly connected to an end portion of the attachment boss portion on the radially outer side.

In the caliper for the opposed piston type disc brake according to an aspect of the present invention, the first beam portion and the second beam portion can be disposed in the circumferential direction with the concave portion sandwiched therebetween.

In the caliper for the opposed piston type disc brake according to an aspect of the present invention, at least one of the first beam portion and the second beam portion can have a cross-sectional area that increases as extending toward the outer side in the axial direction.

In this case, a circumferential width of the second beam portion can increase as extending toward the outer side in the axial direction. Additionally or alternatively, a radial width of the first beam portion can increase as extending toward the outer side in the axial direction.

In the caliper for the opposed piston type disc brake according to an aspect of the present invention, the side bridge can further include, at an opening portion of the concave portion, a protruding portion protruding in a direction in which an opening area of the concave portion decreases.

In this case, the protruding portion can be provided on an outer side portion of the opening portion of the concave portion in the axial direction. Additionally or alternatively, the protruding portion can be provided on an inner side portion and/or an outer side portion of the opening portion of the concave portion in the circumferential direction.

In the caliper for the opposed piston type disc brake according to an aspect of the present invention, a center axis of the concave portion can be inclined with respect to a center axis of the inner cylinder portion in a direction toward an inner side in the circumferential direction as extending toward the outer side in the axial direction.

DESCRIPTION OF EMBODIMENTS

First Embodiment

A first embodiment will be described with reference to FIGS. 1 to 11.

An opposed piston type disc brake device 1 of the present embodiment is used for an automobile, and includes a caliper 2 and a pair of pads 3 (an inner pad and an outer pad).

In the present specification and claims, the terms "axial direction", "circumferential direction", and "radial direction" refer to an axial direction, a circumferential direction, and a radial direction of a disk-shaped rotor 4 (see FIG. 1), unless otherwise specified. Further, an inner side in the circumferential direction refers to a center side of the opposed piston type disc brake device 1 in the circumferential direction, and an outer side in the circumferential direction refers to both sides of the opposed piston type disc brake device 1 in the circumferential direction. A rotation-in side refers to a side of the outer side in the circumferential direction in which the rotor 4 rotating together with a wheel in the state of a vehicle moving forward enters an inner side of the caliper 2, and a rotation-out side refers to a side of the outer side in the circumferential direction in which the rotor 4 gets out of the caliper 2.

[Caliper]

Figure 1:
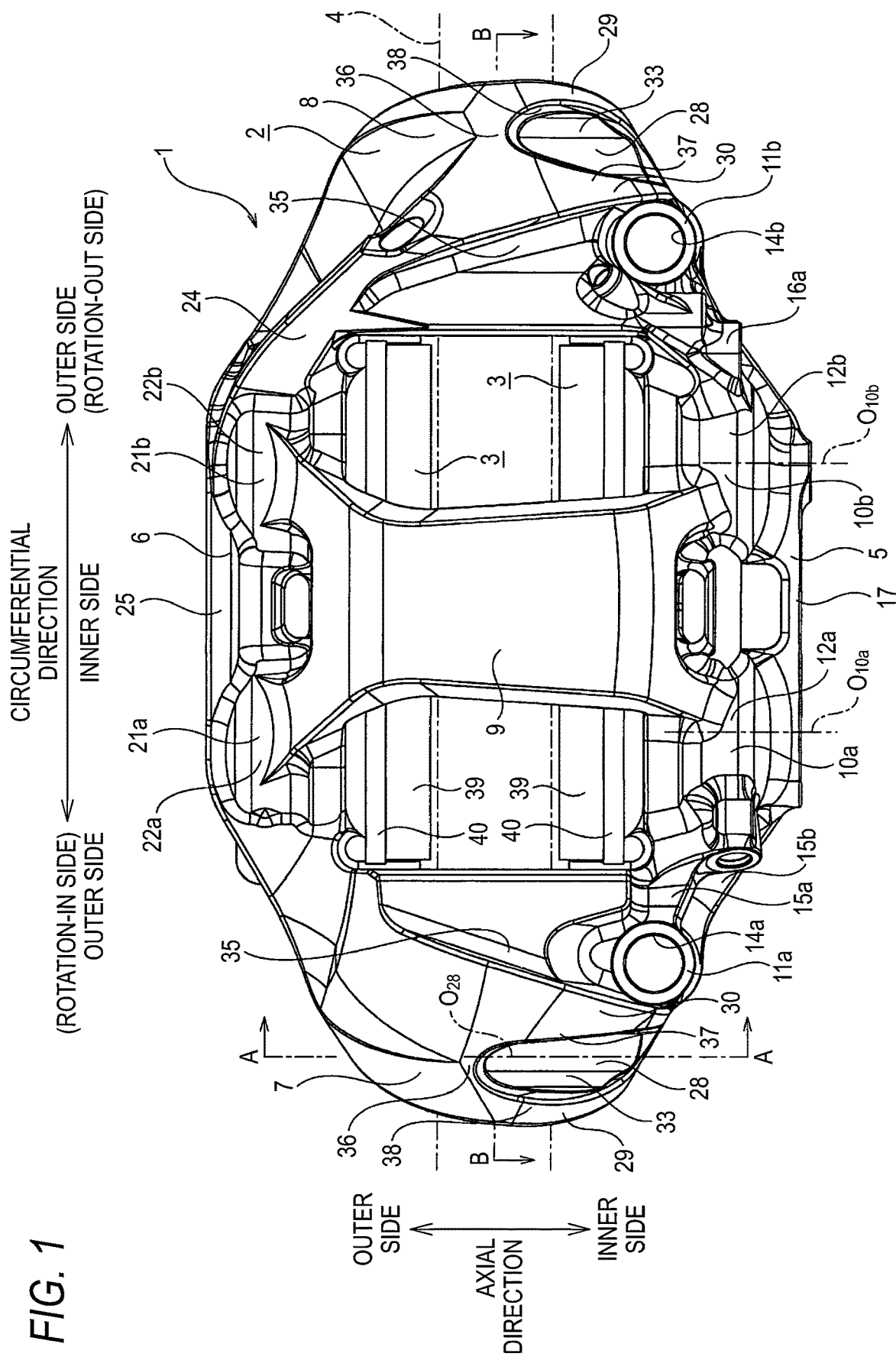
FIG. 1 is a plan view of an opposed piston type disc brake device according to a first embodiment as viewed from a radially outer side.
Figure 2:
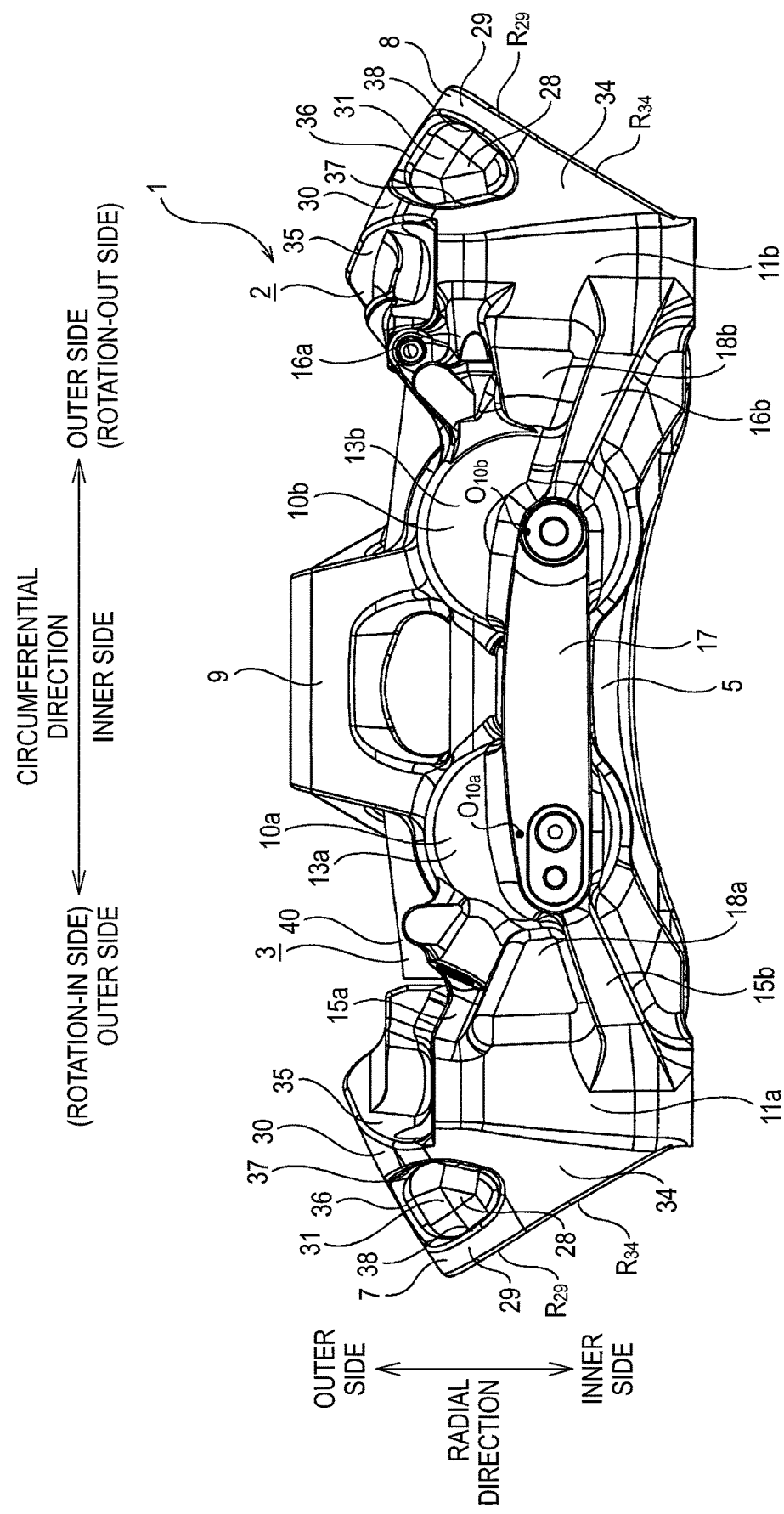
FIG. 2 is a view of the opposed piston type disc brake device according to the first embodiment as viewed from an inner side in an axial direction.
Figure 3:
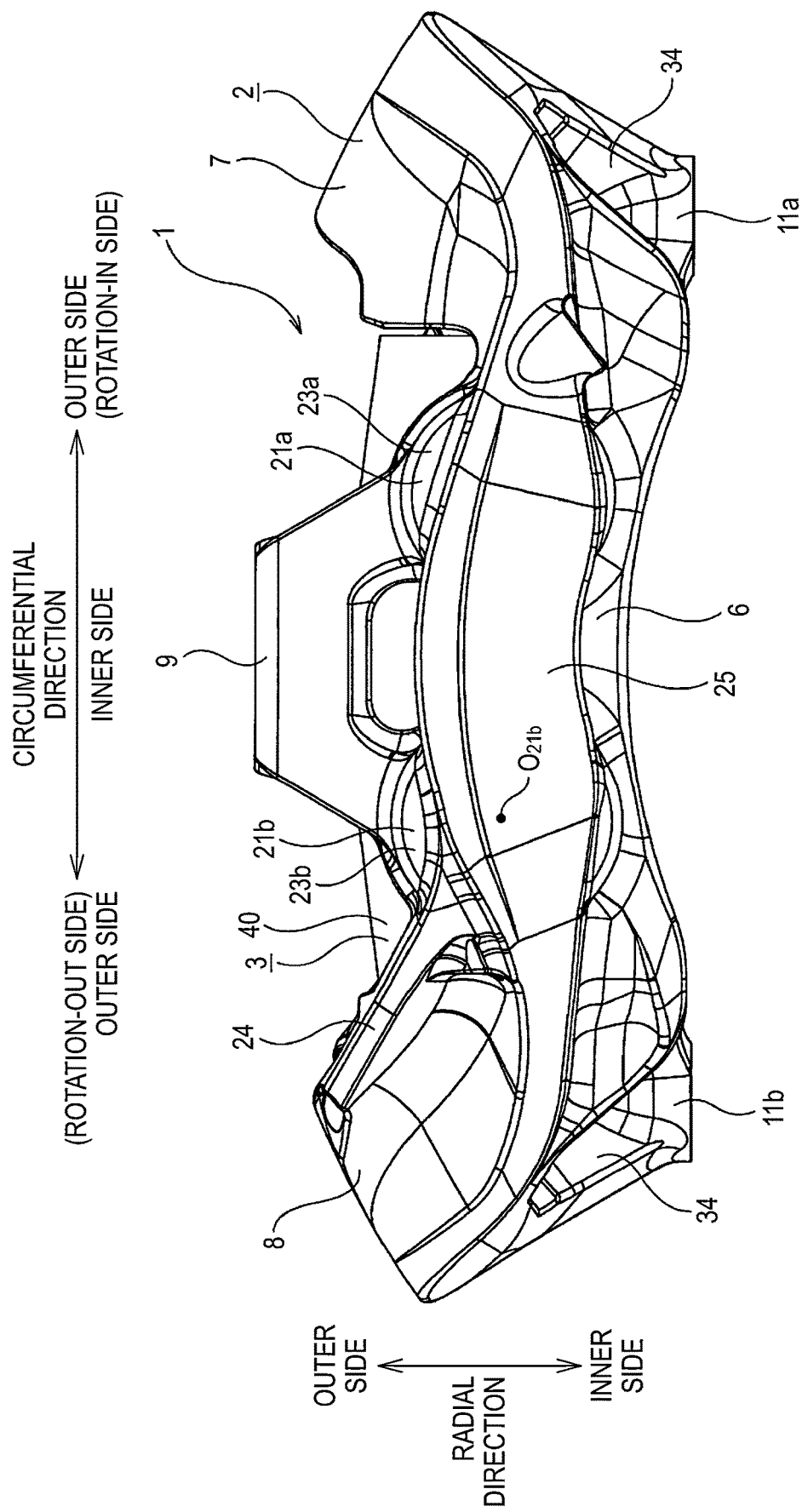
FIG. 3 is a view of the opposed piston type disc brake device according to the first embodiment as viewed from an outer side in the axial direction.
Figure 4:
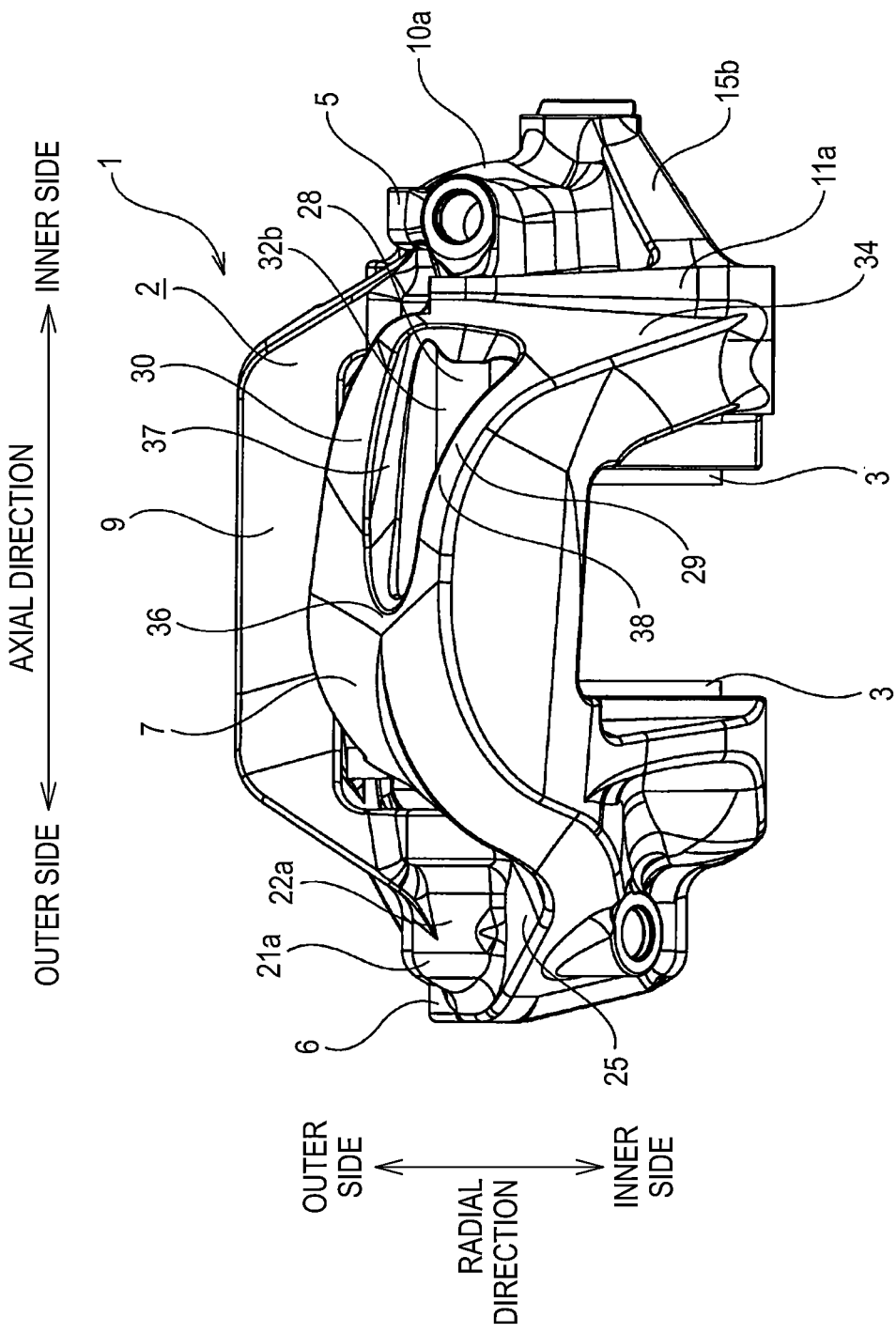
FIG. 4 is a side view as viewed from a left side of FIG. 2.
Figure 5:
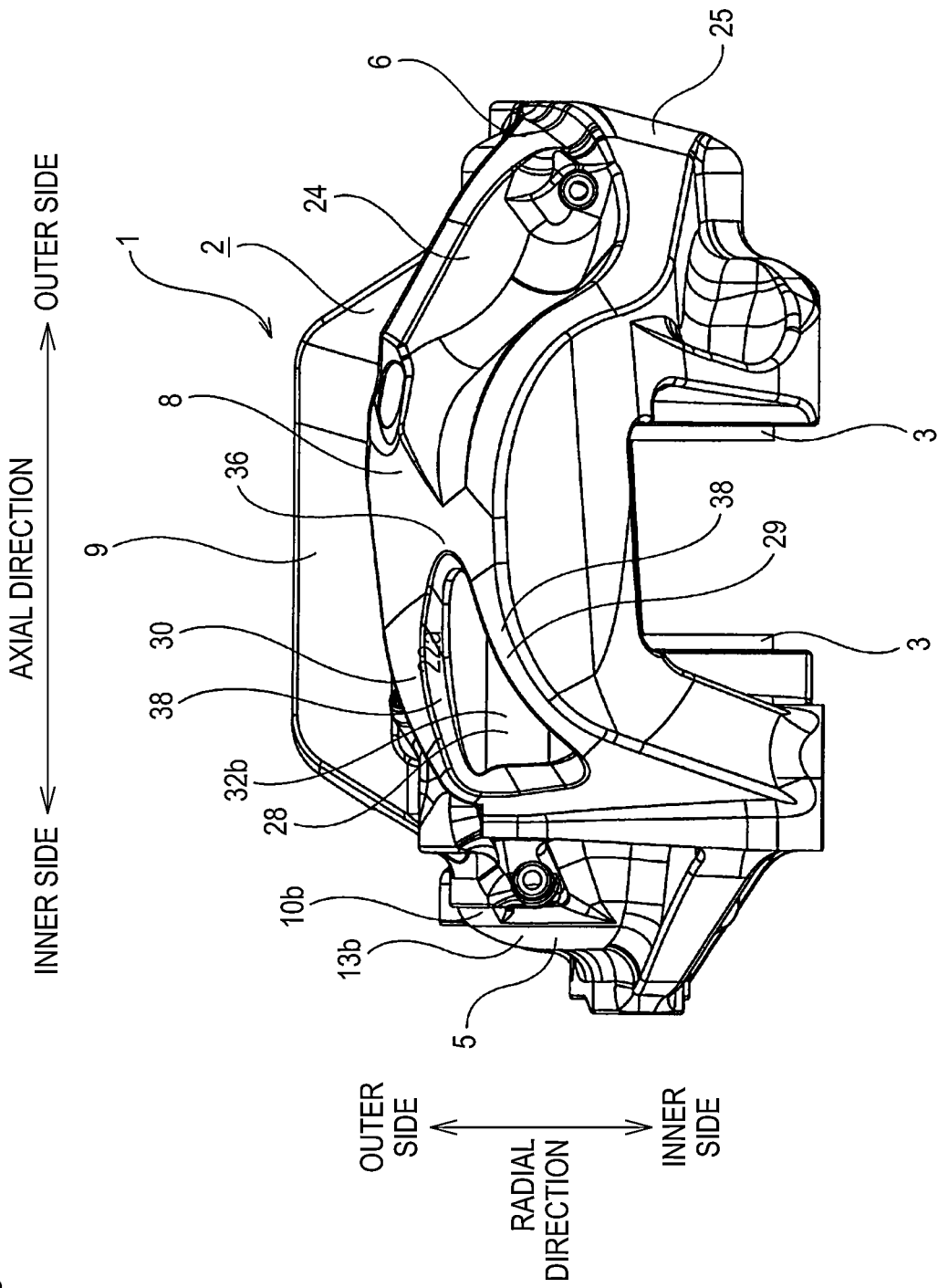
FIG. 5 is a side view as viewed from a right side of FIG. 2.
Figure 6:
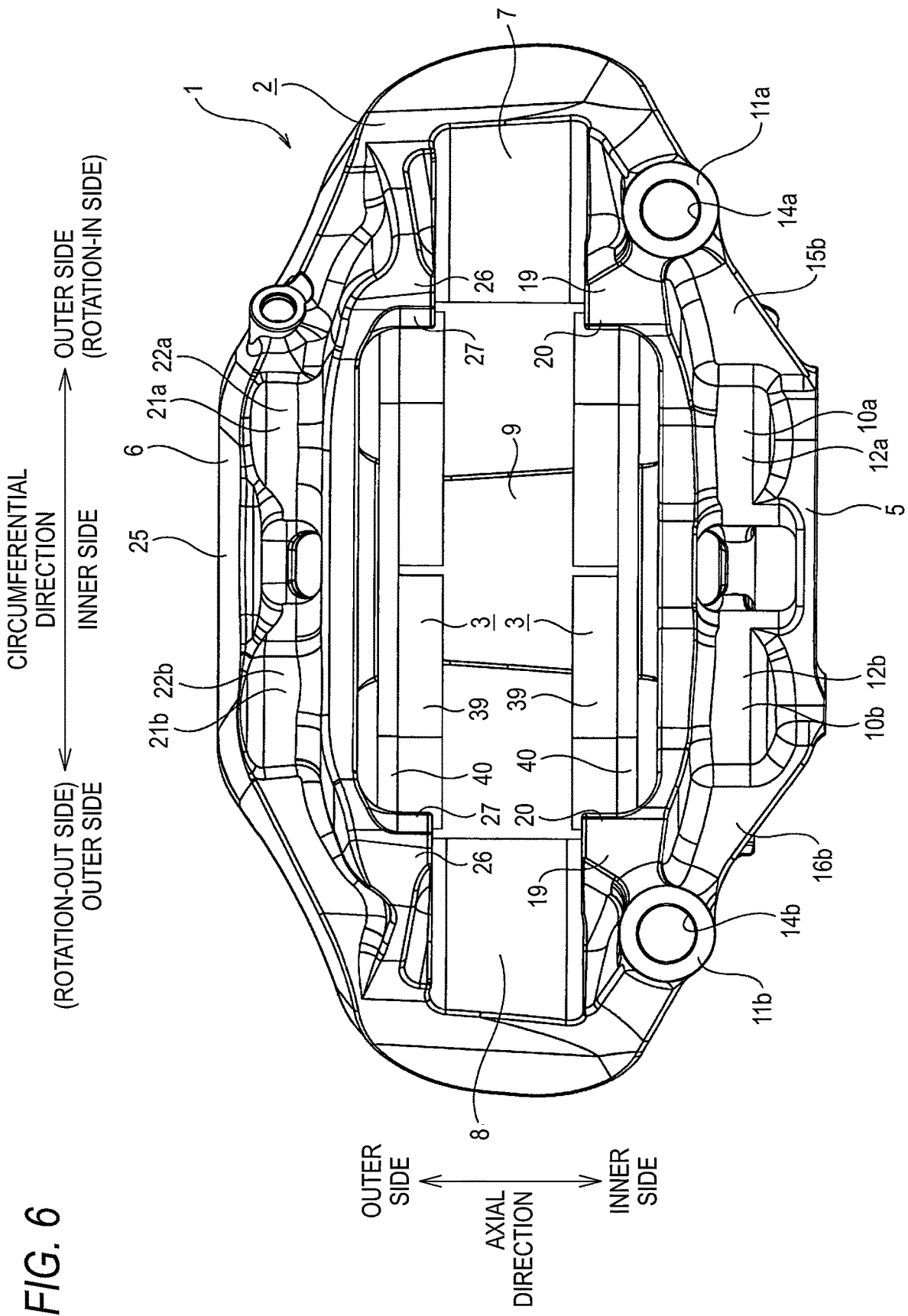
FIG. 6 is a bottom view of the opposed piston type disc brake device according to the first embodiment as viewed from a radially inner side.

The caliper 2 is disposed so as to cover the rotor 4 from a radially outer side, and supports the pair of pads 3 so as to be movable in the axial direction (an up-down direction in FIG. 1, a front-back direction in FIGS. 2 and 3, and a left-right direction in FIGS. 4 and 5). The caliper 2 is integrally formed by subjecting a material made of a light alloy such as an aluminum alloy or an iron-based alloy to casting or the like.

The caliper 2 has a substantially arched shape as viewed in the axial direction, and includes an inner body 5 and an outer body 6 that are disposed so as to sandwich the rotor 4 from both sides in the axial direction, a rotation-in side bridge 7 and a rotation-out side bridge 8 that connect, in the axial direction, end portions of both the inner body 5 and the outer body 6 on both outer sides in the circumferential direction, and a center bridge 9 that connects, in the axial direction, intermediate portions of both the inner body 5 and the outer body 6 in the circumferential direction.

<Inner Body>

The inner body 5 is disposed on an inner side of the rotor 4 in the axial direction. The inner body 5 includes two inner cylinder portions 10a, 10b and two attachment boss portions 11a, 11b.

The inner cylinder portions 10a, 10b are disposed so as to be separated from each other in the circumferential direction. Each of the inner cylinder portions 10a, 10b is formed in a bottomed cylindrical shape, and has a columnar-shaped cylinder space therein. The inner cylinder portions 10a, 10b are disposed at the intermediate portion of the inner body 5 in the circumferential direction, and are open to an outer side surface of the inner body 5 facing the rotor 4 in the axial direction. A part of an outer shape of the inner cylinder portions 10a, 10b having the bottomed cylindrical shape appears on an inner side surface of the inner body 5 in the axial direction. Specifically, on the inner side surface of the inner body 5 in the axial direction, inner side portions of tubular portions 12a, 12b in the axial direction and circular bottom portions 13a, 13b that constitute the inner cylinder portions 10a, 10b appear. Inner pistons (not shown) are fitted to the inner cylinder portions 10a, 10b so as to be displaceable in the axial direction.

The attachment boss portions 11a, 11b are disposed on both outer sides of the inner cylinder portions 10a, 10b in the circumferential direction. Therefore, the attachment boss portions 11a, 11b are disposed on both outer side portions of the inner body 5 in the circumferential direction. Each of the attachment boss portions 11a, 11b has a substantially cylindrical shape, and bolt insertion holes 14a, 14b respectively penetrating interiors of the attachment boss portions 11a, 11b in the radial direction are formed. The caliper 2 is fixed to a knuckle constituting a suspension device of a vehicle body via an adapter (not shown), or is directly fixed by bolts (not shown) inserted through the bolt insertion holes 14a, 14b from the radially outer side. Therefore, end surfaces of the attachment boss portions 11a, 11b on a radially inner side respectively function as seat surfaces. The caliper 2 of the present embodiment is a radial mount type caliper.

The inner body 5 includes a total of four side ribs 15a, 15b, 16a, 16b and one center rib 17 on the inner side surface of the inner body 5 in the axial direction. Both outer side portions of the inner body 5 in the circumferential direction respectively include two among the side ribs 15a, 15b, 16a, 16b, and the intermediate portion of the inner body 5 in the circumferential direction includes the center rib 17. The side ribs 15a, 15b, 16a, 16b and the center rib 17 are thick portions (that are raised toward the inner side in the axial direction) that are thicker than other portions. Therefore, the inner body 5 is increased in thickness and rigidity at the portions where the side ribs 15a, 15b, 16a, 16b and the center rib 17 are respectively provided.

On the inner side surface of the inner body 5 in the axial direction, the side ribs 15a, 15b are provided at outer side portions on the rotation-in side (a left side in FIGS. 1 and 2) in the circumferential direction. The side ribs 15a, 15b extend in the circumferential direction and are disposed to be separated from each other in the radial direction. In other words, a thinned portion 18a that is recessed in the axial direction is provided between the side ribs 15a, 15b. The side ribs 15a, 15b are disposed non-parallel to each other. Each of the side ribs 15a, 15b extends in a direction approaching a center axis $O_{10a}$ of the inner cylinder portion 10a. The side ribs 15a, 15b connect, in the circumferential direction, the attachment boss portion 11a disposed on the rotation-in side and an inner side portion of the inner cylinder portion 10a in the axial direction that is disposed adjacent to an inner side of the attachment boss portion 11a in the circumferential direction.

On the inner side surface of the inner body 5 in the axial direction, the side ribs 16a, 16b are provided at outer side portions on the rotation-out side (a right side in FIGS. 1 and 2) in the circumferential direction. The side ribs 16a, 16b extend in the circumferential direction and are disposed to be separated from each other in the radial direction. In other words, a thinned portion 18b that is recessed in the axial direction is provided between the side ribs 16a, 16b. The side ribs 16a, 16b are disposed non-parallel to each other. Each of the side ribs 16a, 16b extends in a direction approaching a center axis $O_{10b}$ of the inner cylinder portion 10b. The side ribs 16a, 16b connect, in the circumferential direction, the attachment boss portion 11b disposed on the rotation-out side and an inner side portion of the inner cylinder portion 10b in the axial direction that is disposed adjacent to an inner side of the attachment boss portion 11b in the circumferential direction.

The center rib 17 is provided at the intermediate portion in the circumferential direction on the inner side surface of the inner body 5 in the axial direction. The center rib 17 extends in the circumferential direction and covers intermediate portions of the bottom portions 13a, 13b of the inner cylinder portions 10a, 10b in the radial direction from the inner side in the axial direction so as to traverse the intermediate portions in the circumferential direction. Therefore, outer side portions and inner side portions of the bottom portions 13a, 13b of the inner cylinder portions 10a, 10b in the radial direction are not covered by the center rib 17, and respectively protrude from the center rib 17 in the radial direction. End portions of the center rib 17 on both outer side thereof in the circumferential direction are respectively connected to, in the circumferential direction, an end portion of the side rib 15b on the inner side in the circumferential direction disposed on the rotation-in side and an end portion of the side rib 16b on the inner side in the circumferential direction disposed on the rotation-out side.

In an assembled state of the opposed piston type disc brake device 1, the pads 3 disposed on the inner side of the rotor 4 in the axial direction are supported so as to be movable in the axial direction with respect to the inner body 5. For this purpose, the inner body 5 includes inner side pad support portions 19 protruding in the axial direction respectively at both outer side portions in the circumferential direction on the outer side surface of the inner body 5 in the axial direction. In addition, the inner side pad support portions 19 each has an inner side engaging convex portion 20 protruding toward the inner side in the circumferential direction at an inner side portion of the inner side pad support portion 19 in the radial direction.

<Outer Body>

The outer body 6 is disposed on an outer side of the rotor 4 in the axial direction. The outer body 6 includes two outer cylinder portions 21a, 21b.

The outer cylinder portions 21a, 21b are disposed so as to be separated from each other in the circumferential direction. The outer cylinder portions 21a, 21b are disposed at the intermediate portion of the outer body 6 in the circumferential direction, and are open to an inner side surface of the outer body 6 facing the rotor 4 in the axial direction. A part of an outer shape of the outer cylinder portions 21a, 21b having the bottomed cylindrical shape appears on an outer side surface of the outer body 6 in the axial direction. Specifically, on the outer side surface of the outer body 6 in the axial direction, outer side portions of tubular portions 22a, 22b in the axial direction and circular bottom portions 23a, 23b that constitute the outer cylinder portions 21a, 21b appear. Outer pistons (not shown) are respectively fitted to the outer cylinder portions 21a, 21b so as to be displaceable in the axial direction.

The outer body 6 includes one auxiliary rib 24 and one main rib 25 on the outer side surface of the outer body 6 in the axial direction. In the present embodiment, the auxiliary rib 24 is provided at an outer side portion in the circumferential direction, on the rotation-out side of an outer side portion of the outer body 6 in the radial direction, and the main rib 25 is provided on the intermediate portion of the outer body 6 in the radial direction. The auxiliary rib 24 and the main rib 25 are thick portions (that are raised toward the outer side in the axial direction) that are thicker than other portions. Therefore, the outer body 6 is increased in thickness and rigidity at the portions where the auxiliary rib 24 and the main rib 25 are respectively provided.

The auxiliary rib 24 extends in the circumferential direction and extends in a direction approaching a center axis $O_{21b}$ of the outer cylinder portion 21b. The auxiliary rib 24 connects, in the circumferential direction, an outer side surface of a portion of the rotation-out side bridge 8 in the axial direction and a portion of the outer cylinder portion 21b on the outer side in the axial direction. The portion having the outer side surface is on the inner side in the circumferential direction.

The main rib 25 is provided at the intermediate portion of the outer body 6 in the radial direction on the outer side surface of the outer body 6 in the axial direction over an entire length in the circumferential direction. The main rib 25 extends in the circumferential direction and covers intermediate portions of the bottom portions 23a, 23b of the outer cylinder portions 21a, 21b in the radial direction from the outer side in the axial direction so as to traverse the intermediate portions in the circumferential direction. Therefore, outer side portions and inner side portions of the bottom portions 23a, 23b of the outer cylinder portions 21a, 21b in the radial direction are not covered by the main rib 25, and respectively protrude from the main rib 25 in the radial direction. A width of the main rib 25 in the radial direction is larger in a portion in the inner side in the circumferential direction that covers the bottom portions 23a, 23b of the outer cylinder portions 21a, 21b as compared with widths of both portions of the main rib 25 on the outer side in the circumferential direction. End portions of the main rib 25 on both outer side thereof in the circumferential direction are respectively connected to, in the circumferential direction, a surface of a portion of the rotation-in side bridge 7 on the outer side in the circumferential direction and a surface of a portion of the rotation-out side bridge 8 on the outer side in the circumferential direction. Both the surface of the portion of the rotation-in side bridge 7 and the surface of the portion of the rotation-out side bridge 8 are surfaces on the outer side in the axial direction.

In the assembled state of the opposed piston type disc brake device 1, the pads 3 disposed on the outer side of the rotor 4 in the axial direction are supported so as to be movable in the axial direction with respect to the outer body 6. For this purpose, the outer body 6 includes outer side pad support portions 26 protruding in the axial direction respectively at both outer side portions in the circumferential direction on the inner side surface of the outer body 6 in the axial direction. In addition, the outer side pad support portions 26 each is provided with an outer side engaging convex portion 27 protruding toward the inner side in the circumferential direction at an inner side portion of the outer side pad support portion 26 in the radial direction.

<Side Bridge>

The rotation-in side bridge 7 and the rotation-out side bridge 8 are respectively disposed so as to cover the rotor 4 from the radially outer side, and respectively connect, in the axial direction, the end portions of the inner body 5 on the both outer sides in the circumferential direction and the end portions of the outer body 6 on the both outer sides in the circumferential direction. Specifically, on the rotation-in side, the rotation-in side bridge 7 connects, in the axial direction, the end portion of the inner body 5 on the outer side in the circumferential direction and the end portion of the outer body 6 on the outer side in the circumferential direction. On the other hand, on the rotation-out side, the rotation-out side bridge 8 connects, in the axial direction, the end portion of the inner body 5 on the outer side in the circumferential direction and the end portion of the outer body 6 on the outer side in the circumferential direction. Each of the rotation-in side bridge 7 and the rotation-out side bridge 8 is curved in an arc shape along an outer circumferential edge of the rotor 4, and covers the rotor 4 from the radially outer side via a predetermined gap. At a portion surrounded by the inner body 5, the outer body 6, the rotation-in side bridge 7, and the rotation-out side bridge 8, an opening portion that penetrates in the radial direction and has a substantially rectangular shape in a plan view is formed.

Each of the rotation-in side bridge 7 and the rotation-out side bridge 8 includes a concave portion 28, a first beam portion 29, and a second beam portion 30.

<Concave Portion>

The concave portions 28 are respectively provided at intermediate portions of the rotation-in side bridge 7 and the rotation-out side bridge 8 in the circumferential direction. The concave portions 28 are open on outer surfaces of the rotation-in side bridge 7 and the rotation-out side bridge 8. In the present embodiment, the concave portions 28 are respectively open to outer circumferential surfaces (outer side surfaces in the radial direction) of the rotation-in side bridge 7 and the rotation-out side bridge 8 and inner side surfaces of the rotation-in side bridge 7 and the rotation-out side bridge 8 in the axial direction. As shown in FIG. 2, opening portions of the concave portions 28 on the inner side in the axial direction each has a substantially rounded triangular shape. As shown in FIG. 1, the opening portions of the concave portions 28 on the radially outer side each has a substantially oval shape.

Each of the concave portions 28 is a concave groove extending in the axial direction, and is provided in a portion that is a half of each of the rotation-in side bridge 7 and the rotation-out side bridge 8 on the inner side in the axial direction.

The concave portions 28 each includes an axial bottom portion 31 at an end portion on the outer side in the axial direction, circumferential wall portions 32a, 32b at both sides in the circumferential direction, and a radial bottom portion 33 at an end portion on the radially inner side.

Each of the axial bottom portions 31 is located at an intermediate portion of each of the rotation-in side bridge 7 and the rotation-out side bridge 8 in the axial direction. In the present embodiment, the axial bottom portion 31 of the concave portion 28 provided in the rotation-in side bridge 7 is disposed at substantially the same axial position as the inner side surface of the outer body 6 in the axial direction. The axial bottom portion 31 of the concave portion 28 provided in the rotation-out side bridge 8 is located on the inner side in the axial direction with respect to the axial bottom portion 31 of the concave portion 28 provided in the rotation-in side bridge 7. That is, a length of the concave portion 28 provided in the rotation-in side bridge 7 in the axial direction is longer than a length of the concave portion 28 provided in the rotation-out side bridge 8 in the axial direction. This is because the caliper 2 is required to have rigidity at a rotation-out side portion higher than rigidity at a rotation-in side portion, and a deformation pattern differs between the rotation-out side portion and the rotation-in side portion of the caliper 2.

The circumferential wall portion 32a disposed on the outer side in the circumferential direction is disposed substantially parallel to outer side surfaces of the rotation-in side bridge 7 and the rotation-out side bridge 8 in the circumferential direction. On the other hand, the circumferential wall portion 32b disposed on the inner side in the circumferential direction is slightly inclined in a direction toward the outer side in the circumferential direction as extending toward the radially inner side with respect to a center axis $O_{11}$ of the attachment boss portions 11a, 11b.

Each of the radial bottom portions 33 is located at an intermediate portion of each of the rotation-in side bridge 7 and the rotation-out side bridge 8 in the radial direction. In the present embodiment, the radial bottom portions 33 are located slightly toward the radially outer side with respect to the center axes $O_{10a}$, $O_{10b}$ of the inner cylinder portions 10a, 10b. Each of the radial bottom portions 33 smoothly connects end portions of the circumferential wall portions 32a, 32b on the radially inner side in the circumferential direction.

The axial bottom portion 31, the circumferential wall portions 32a, 32b, and the radial bottom portion 33, which constitute an inner surface of the concave portion 28, are smoothly connected to each other. That is, the inner surface of the concave portion 28 is a smooth concave curved surface. However, when the present invention is implemented, the inner surface of the concave portion may include a flat surface.

An axial dimension of the concave portion 28 is larger than a circumferential dimension of the concave portion 28, and is about ½ of an axial dimension of each of the rotation-in side bridge 7 and the rotation-out side bridge 8. A radial dimension (depth) of the concave portion 28 is larger than ½ of a radial dimension of each of the rotation-in side bridge 7 and the rotation-out side bridge 8 at a portion where the concave portion 28 is provided. Therefore, the concave portion 28 is provided in a range from a portion of each of the rotation-in side bridge 7 and the rotation-out side bridge 8 on the radially outer side to the intermediate portion of each of the rotation-in side bridge 7 and the rotation-out side bridge 8 in the radial direction. Thus, the rotation-in side bridge 7 and the rotation-out side bridge 8 each is formed to have a hollow shape in a range of the intermediate portion in the circumferential direction from the portion on the radially outer side to the intermediate portion in the radial direction.

As shown in FIG. 1, a center axis $O28$ of the concave portion 28 is disposed substantially parallel to the center axes $O_{10a}$, $O_{10b}$ of the inner cylinder portions 10a, 10b. However, when the present invention is implemented, it is also possible to incline the center axis of the concave portion with respect to the center axis of the inner cylinder portion in a direction toward the inner side in the circumferential direction as extending toward the outer side in the axial direction. In this case, the center axis of the concave portion can be inclined with respect to the center axis of the inner cylinder portion by more than 0° and 30° or less in the direction toward the inner side in the circumferential direction as extending toward the outer side in the axial direction. Accordingly, the first beam portion and the second beam portion disposed so as to sandwich the concave portion can be extended so as to approach the outer cylinder portion.

<First Beam Portion and Second Beam Portion>

The first beam portion 29 and the second beam portion 30 extend in the axial direction and are disposed so as to sandwich the concave portion 28. In the present embodiment, the first beam portion 29 and the second beam portion 30 are disposed in the circumferential direction with the concave portion 28 sandwiched therebetween. Specifically, the first beam portion 29 is disposed on the outer side of the concave portion 28 in the circumferential direction, and the second beam portion 30 is disposed on the inner side of the concave portion 28 in the circumferential direction. The first beam portion 29 and the second beam portion 30 are provided in a range of the portion that is a half of each of the rotation-in side bridge 7 and the rotation-out side bridge 8 on the inner side in the axial direction from the portion on the radially outer side to the intermediate portion in the radial direction.

<First Beam Portion>

The first beam portions 29 are respectively provided at end portions of the rotation-in side bridge 7 and the rotation-out side bridge 8 on the outer side in the circumferential direction. An inner side surface of the first beam portion 29 in the circumferential direction is the circumferential wall portion 32a of the concave portion 28, and an outer side surface of the first beam portion 29 in the circumferential direction is a flat surface that constitutes the outer side surface of each of the rotation-in side bridge 7 and the rotation-out side bridge 8 in the circumferential direction. A surface of the first beam portion 29 on the radially outer side is a convex curved surface that forms the outer circumferential surface of each of the rotation-in side bridge 7 and the rotation-out side bridge 8.

End portions of the first beam portions 29 on the inner side in the axial direction are connected to boss connecting portions 34 of the rotation-in side bridge 7 and the rotation-out side bridge 8, the boss connecting portions 34 being located near outer side portions of the attachment boss portions 11a, 11b in the circumferential direction and connected to the outer side portions of the attachment boss portions 11a, 11b in the circumferential direction. Therefore, in the present embodiment, the end portions of the first beam portions 29 on the inner side in the axial direction are connected to the attachment boss portions 11a, 11b via the boss connecting portions 34. On the other hand, each of end portions of the first beam portions 29 on the outer side in the axial direction is connected to a portion that is a half of each of the rotation-in side bridge 7 and the rotation-out side bridge 8 on the outer side in the axial direction.

The boss connecting portions 34 each constitutes an inner side portion of each of the rotation-in side bridge 7 and the rotation-out side bridge 8 in the axial direction, and is disposed on the inner side in the axial direction with respect to the rotor 4.

A ridgeline $R_{29}$ between a surface on the radially outer side and an outer side surface in the circumferential direction that constitute an outer surface of the first beam portion 29 is curved in a direction toward the radially inner side and the inner side in the circumferential direction as extending toward the inner side in the axial direction, and is smoothly connected to a ridgeline $R_{34}$ of the boss connecting portion 34 on the outer side in the circumferential direction. The ridgelines $R_{34}$ of the boss connecting portions 34 on the outer side in the circumferential direction extend in a direction toward the inner side in the circumferential direction as extending toward the radially inner side, and are respectively connected to end portions of the attachment boss portions 11a, 11b on the radially inner side. Therefore, in the present embodiment, the ridgelines $R_{29}$ of the first beam portions 29 are respectively connected to the end portions of the attachment boss portions 11a, 11b on the radially inner side via the ridgelines $R_{34}$ of the boss connecting portions 34. Specifically, the ridgelines $R_{29}$ of the first beam portions 29 are respectively connected to portions, on the outer side in the circumferential direction, of the end portions on the radially inner side on outer circumferential side surfaces of the attachment boss portions 11a, 11b via the ridgelines $R_{34}$ of the boss connecting portions 34.

A circumferential width of the first beam portion 29 is substantially constant in the axial direction. Since the surface of the first beam portion 29 on the radially outer side is the convex curved surface curved in a direction toward the radially outer side as extending toward the outer side in the axial direction, a radial width of the first beam portion 29 increases as extending toward the outer side in the axial direction. Therefore, a cross-sectional area of the first beam portion 29 with respect to a virtual plane orthogonal to a center axis of the rotor 4 increases as extending toward the outer side in the axial direction.

<Second Beam Portion>

The second beam portions 30 are respectively provided at the intermediate portions of the rotation-in side bridge 7 and the rotation-out side bridge 8 in the circumferential direction. The second beam portions 30 are disposed on the inner side in the circumferential direction with respect to the first beam portions 29. An outer side surface of the second beam portion 30 in the circumferential direction is the circumferential wall portion 32b of the concave portion 28, and an inner side surface of the second beam portion 30 in the circumferential direction has a step surface 35 having a flat surface shape that extends in a direction toward the inner side in the circumferential direction as extending toward the outer side in the axial direction. A surface of the second beam portion 30 on the radially outer side is a convex curved surface that forms the outer circumferential surface of each of the rotation-in side bridge 7 and the rotation-out side bridge 8. An end surface of the second beam portion 30 on the inner side in the axial direction constitutes the inner side surface of each of the rotation-in side bridge 7 and the rotation-out side bridge 8 in the axial direction.

End portions of the second beam portions 30 on the inner side in the axial direction are directly connected to end portions of the attachment boss portions 11a, 11b on the radially outer side. Specifically, the end portions of the second beam portions 30 on the inner side in the axial direction are respectively connected to portions, on the outer side in the circumferential direction, of the end portions on the radially outer side on the outer circumferential side surfaces of the attachment boss portions 11a, 11b. On the other hand, each of end portions of the second beam portions 30 on the outer side in the axial direction is connected to the portion that is a half of each of the rotation-in side bridge 7 and the rotation-out side bridge 8 on the outer side in the axial direction.

The step surfaces 35 constituting the inner side surfaces of the second beam portions 30 in the circumferential direction are respectively inclined in a direction toward the inner side in the circumferential direction with respect to each of the center axes $O_{10a}$, $O_{10b}$ of the inner cylinder portions 10a, 10b as extending toward the outer side in the axial direction. Therefore, a circumferential width of the second beam portion 30 increases as extending toward the outer side in the axial direction. Further, since the surface of the second beam portion 30 on the radially outer side is the convex curved surface curved in a direction toward the radially outer side as extending toward the outer side in the axial direction, a radial width of the second beam portion 30 also increases as extending toward the outer side in the axial direction. Therefore, a cross-sectional area of the second beam portion 30 with respect to the virtual plane orthogonal to the center axis of the rotor 4 increases as extending toward the outer side in the axial direction.

Figure 7:
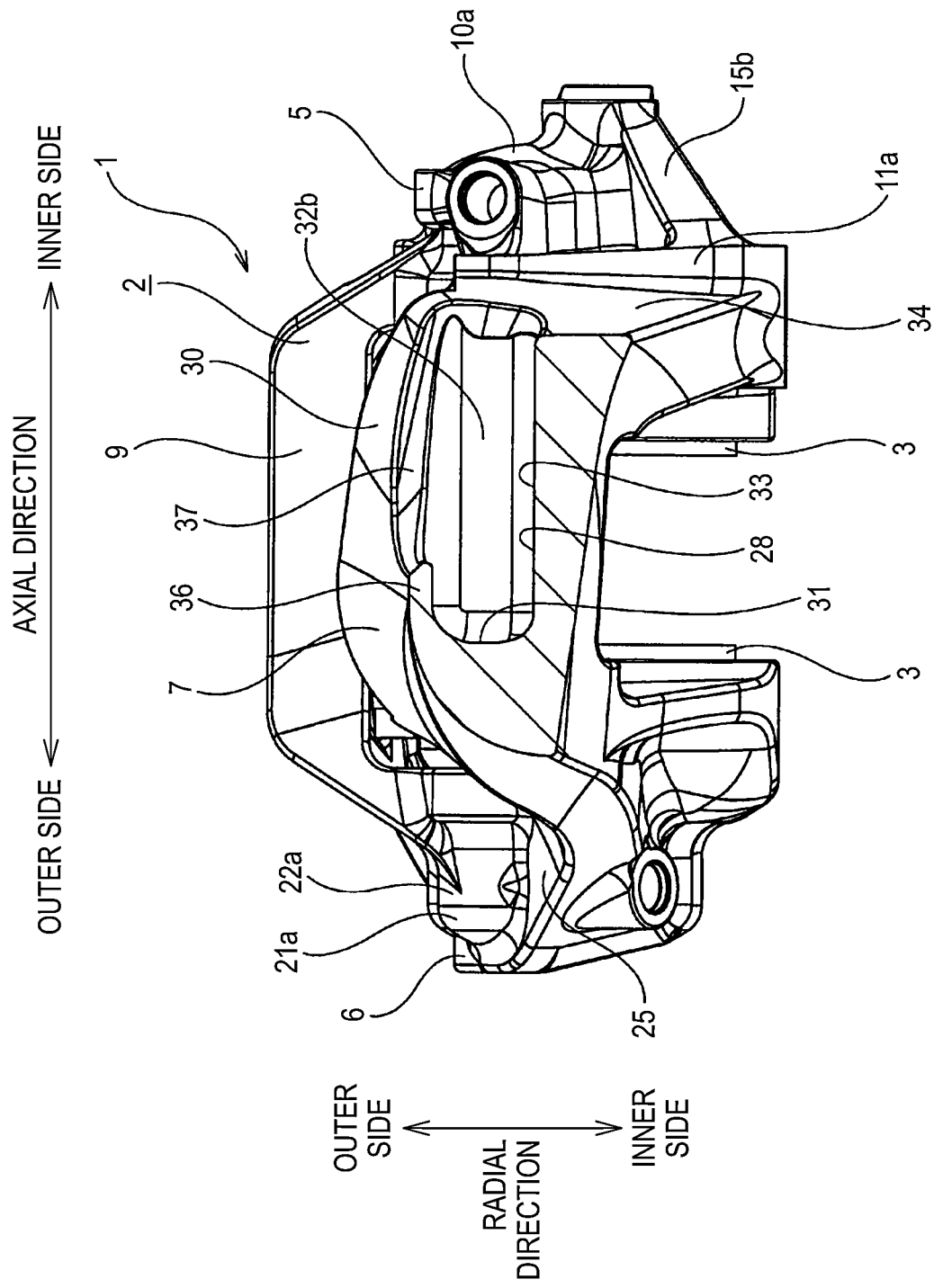
FIG. 7 is a cross-sectional view taken along a line A-A of FIG. 1.
Figure 8:
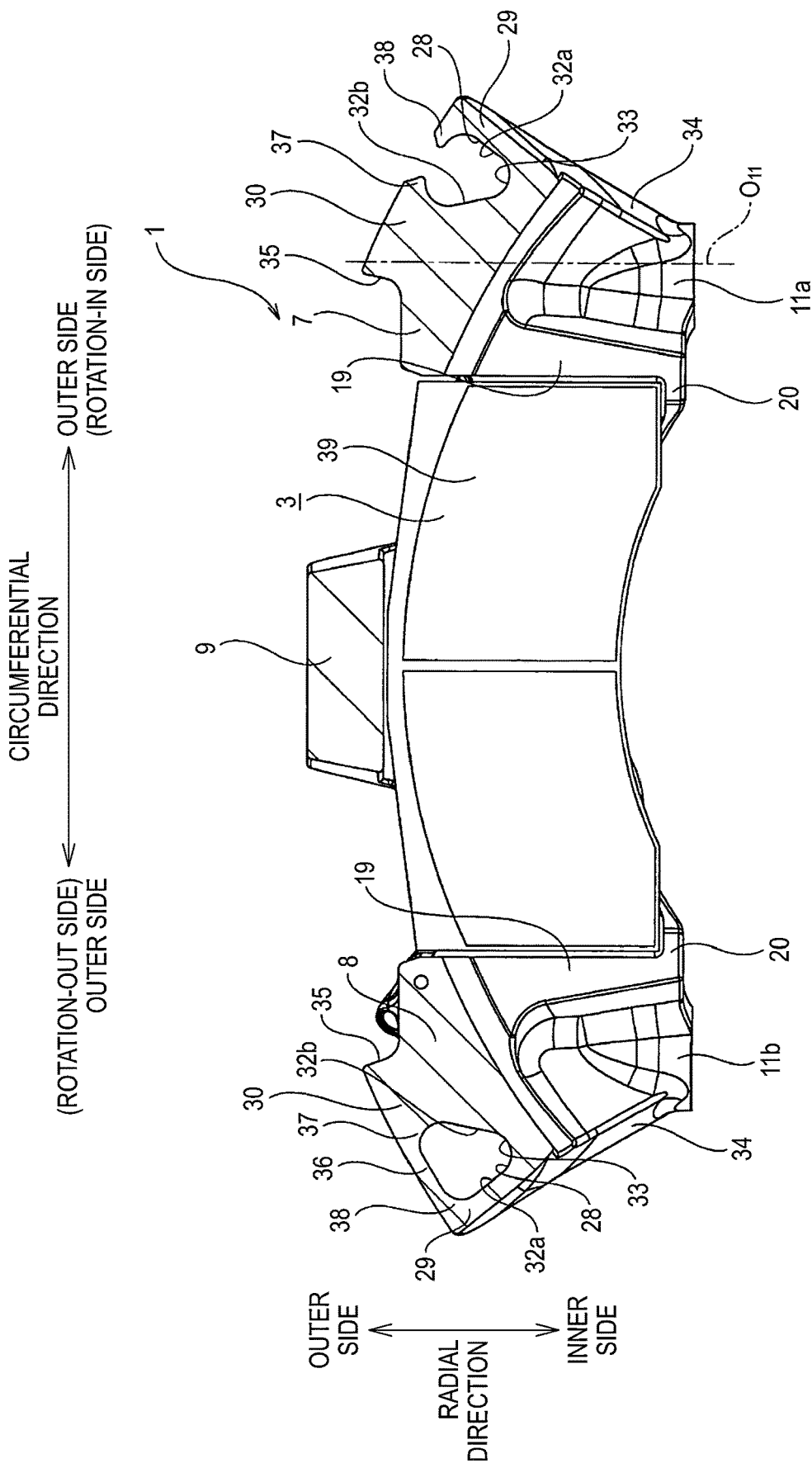
FIG. 8 is a cross-sectional view taken along a line B-B of FIG. 1.
Figure 9:
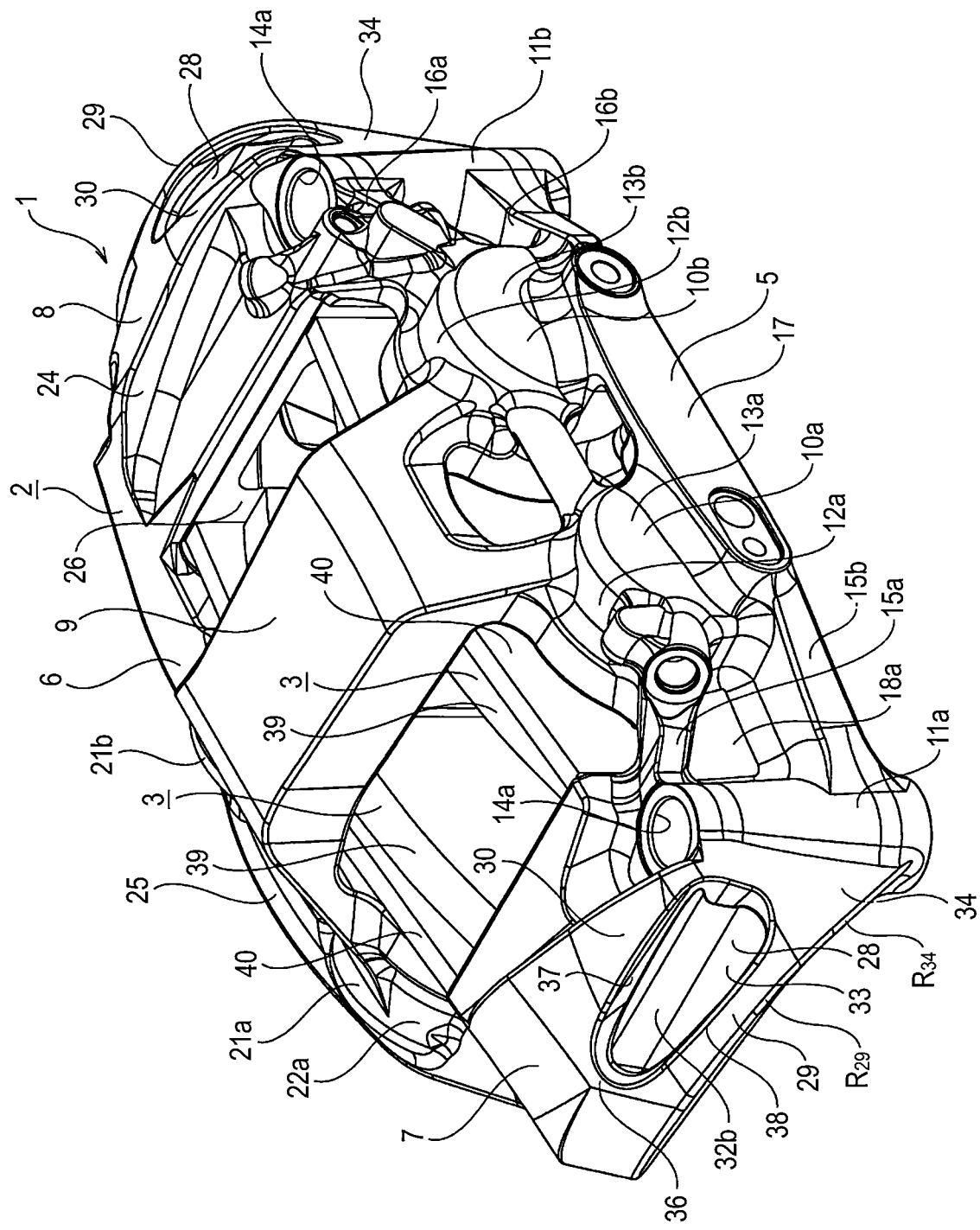
FIG. 9 is a perspective view of the opposed piston type disc brake device according to the first embodiment as viewed from the inner side in the axial direction and the radially outer side.
Figure 10:
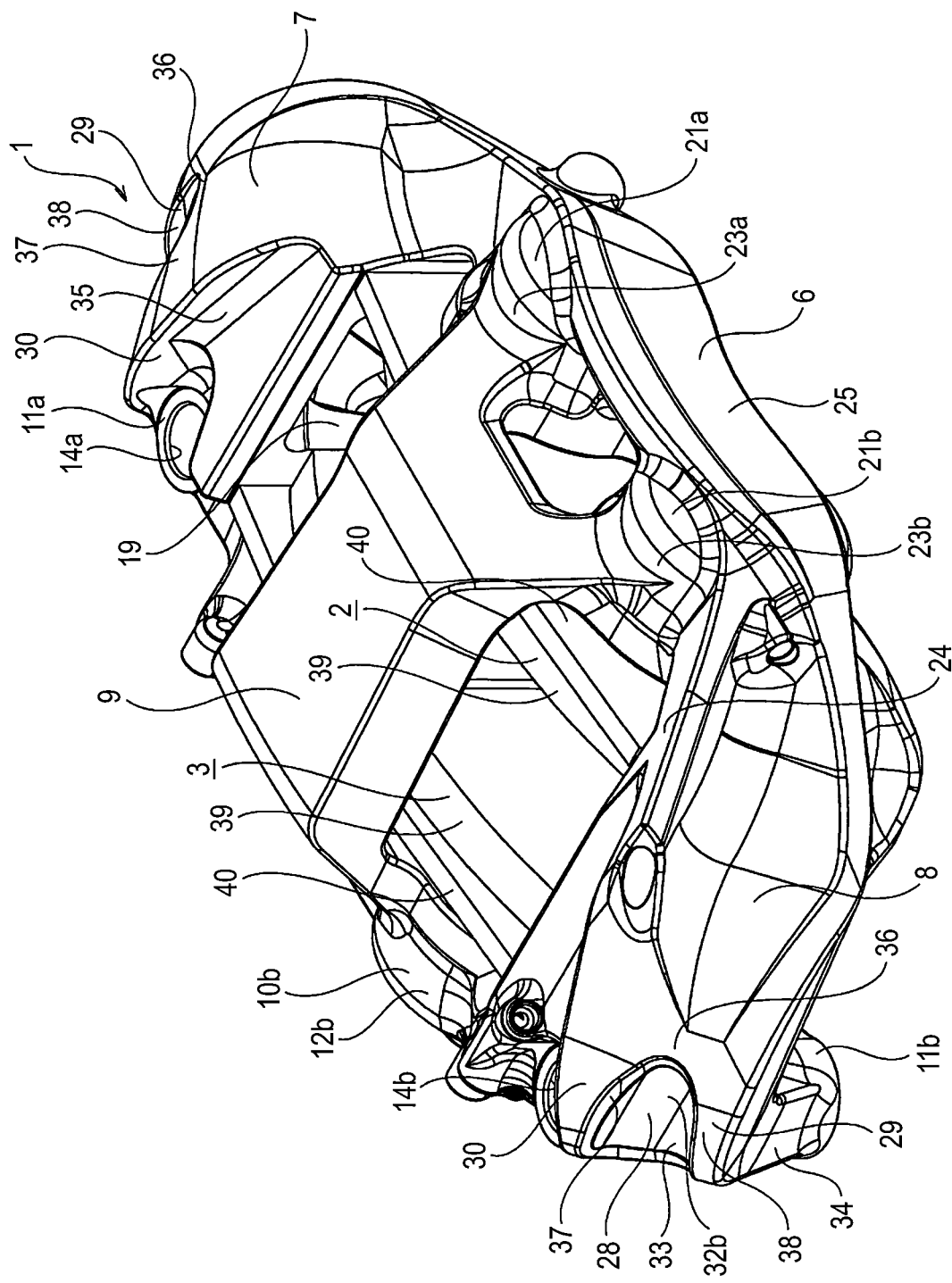
FIG. 10 is a perspective view of the opposed piston type disc brake device according to the first embodiment as viewed from the outer side in the axial direction and the radially outer side.
Figure 11:
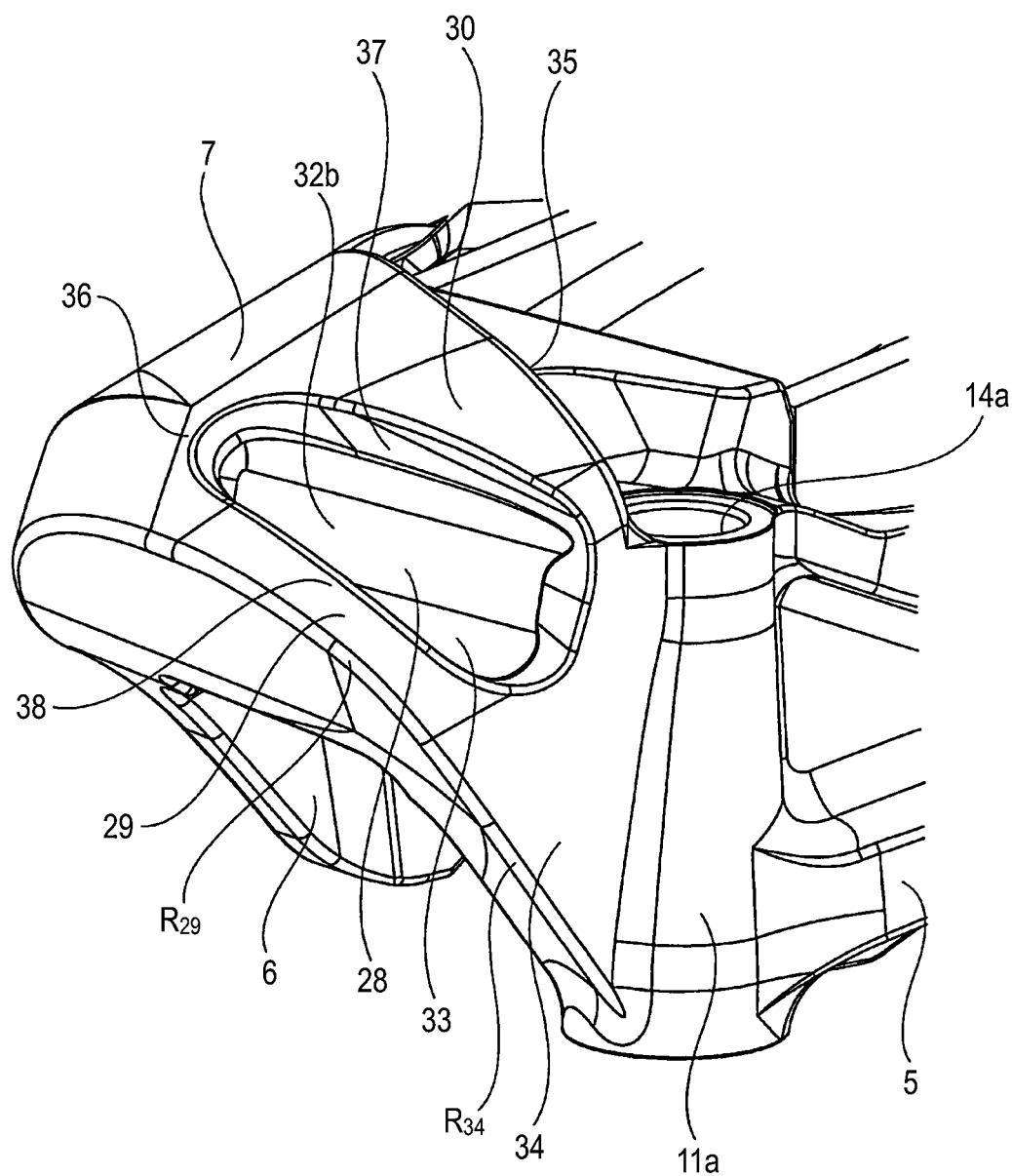
FIG. 11 is a partially enlarged view of FIG. 9.

As shown in FIGS. 7 and 8, each of the rotation-in side bridge 7 and the rotation-out side bridge 8 further includes an axially protruding portion 36, a circumferentially inward protruding portion 37, and a circumferentially outward protruding portion 38 at the opening portion of the concave portion 28.

As shown in FIG. 7, the axially protruding portion 36 is provided at an outer side portion of the opening portion of the concave portion 28 in the axial direction, and protrudes in a direction in which an opening area of the concave portion 28 decreases, that is, toward the inner side in the axial direction. That is, the axially protruding portion 36 is provided along an end portion of the axial bottom portion 31 of the concave portion 28 on the radially outer side. A protruding amount of the axially protruding portion 36 in the axial direction is about 5% to 30% of the axial dimension of the concave portion 28. A thickness of the axially protruding portion 36 in the radial direction is about 10% to 50% of the depth of the concave portion 28 in the radial direction.

As shown in FIG. 8, the circumferentially inward protruding portion 37 is provided at an inner side portion of the opening portion of the concave portion 28 in the circumferential direction, and protrudes in the direction in which the opening area of the concave portion 28 decreases, that is, toward the outer side in the circumferential direction. That is, the circumferentially inward protruding portion 37 is provided along an end portion of the outer side surface of the second beam portion 30 in the circumferential direction (the circumferential wall portion 32b of the concave portion 28) on the radially outer side. A protruding amount of the circumferentially inward protruding portion 37 in the circumferential direction is smaller than the protruding amount of the axially protruding portion 36, and is about 10% to 35% of the circumferential dimension of the concave portion 28. A thickness of the circumferentially inward protruding portion 37 in the radial direction is substantially the same as the thickness of the axially protruding portion 36 in the radial direction.

As shown in FIG. 8, the circumferentially outward protruding portion 38 is provided at an outer side portion of the opening portion of the concave portion 28 in the circumferential direction, and protrudes in the direction in which the opening area of the concave portion 28 decreases, that is, toward the inner side in the circumferential direction. That is, the circumferentially outward protruding portion 38 is provided along an end portion of the inner side surface of the first beam portion 29 in the circumferential direction (the circumferential wall portion 32a of the concave portion 28) on the radially outer side. A protruding amount of the circumferentially outward protruding portion 38 in the circumferential direction is substantially the same as the protruding amount of the circumferentially inward protruding portion 37, or larger than the protruding amount of the circumferentially inward protruding portion 37, and is about 10% to 45% of the circumferential dimension of the concave portion 28. A thickness of the circumferentially outward protruding portion 38 in the radial direction is substantially the same as the thicknesses of the axially protruding portion 36 and the circumferentially inward protruding portion 37 in the radial direction.

End portions of the axially protruding portion 36 on both sides in the circumferential direction are smoothly connected to an end portion of the circumferentially inward protruding portion 37 on the inner side in the axial direction and an end portion of the circumferentially outward protruding portion 38 on the inner side in the axial direction.

In the present embodiment, the opening portion of the concave portion 28 is provided with the axially protruding portion 36, the circumferentially inward protruding portion 37, and the circumferentially outward protruding portion 38, and thus, the opening portion (opening area) of the concave portion 28 is smaller as compared with a case where the axially protruding portion 36, the circumferentially inward protruding portion 37, and the circumferentially outward protruding portion 38 are not provided.

The center bridge 9 is disposed on the radially outer side with respect to the outer circumferential edge of the rotor 4. The center bridge 9 is disposed between the rotation-in side bridge 7 and the rotation-out side bridge 8 in the circumferential direction, and connects, in the axial direction, the intermediate portions of the inner body 5 and the outer body 6 in the circumferential direction. Both side portions of the center bridge 9 in the axial direction each has a bifurcated shape. End portions of the center bridge 9 on the inner side in the axial direction are respectively connected to outer side portions of the pair of inner cylinder portions 10a, 10b in the radial direction. End portions of the center bridge 9 on the outer side in the axial direction are respectively connected to outer side portions of the pair of outer cylinder portion 21a, 21b in the radial direction.

The pair of pads 3 each includes a lining (friction material) 39 and a metal back plate (pressure plate) 40 supporting a back surface of the lining 39.

In the present embodiment, the pad 3 (inner pad) disposed on the inner side of the rotor 4 in the axial direction is disposed between the pair of inner side pad support portions 19, and end portions of inner side portions of the back plate 40, which constitutes the corresponding pad 3, in the radial direction on both outer sides in the circumferential direction are engaged with the pair of inner side engaging convex portions 20 so as to be movable in the axial direction. In this manner, the pad 3 is supported so as to be movable in the axial direction with respect to the inner body 5.

Further, the pad 3 (outer pad) disposed on the outer side of the rotor 4 in the axial direction is disposed between the pair of outer side pad support portions 26, and end portions of inner side portions of the back plate 40, which constitutes the corresponding pad 3, in the radial direction on both outer sides in the circumferential direction are engaged with the pair of outer side engaging convex portions 27 so as to be movable in the axial direction. In this manner, the pad 3 is supported so as to be movable in the axial direction with respect to the outer body 6.

Although not shown in the drawings, it is possible that a pad clip is interposed between both outer side surfaces of the back plate 40 constituting each of the pair of pads 3 in the circumferential direction and inner side surfaces of each of the inner side pad support portion 19 and the outer side pad support portion 26 in the circumferential direction.

Also in the case of the opposed piston type disc brake device 1 according to the present embodiment as described above, at the time of braking, brake oil is fed from a master cylinder to each of the inner cylinder portions 10a, 10b and the outer cylinder portions 21a, 21b. Accordingly, the inner pistons respectively fitted to the inner cylinder portions 10a, 10b are pushed out in the axial direction, and the pad 3 supported by the inner body 5 is pressed against an inner side surface of the rotor 4 in the axial direction. Similarly, the outer pistons respectively fitted to the outer cylinder portions 21a, 21b are pushed out in the axial direction, and the pad 3 supported by the outer body 6 is pressed against an outer side surface of the rotor 4 in the axial direction. As a result, the rotor 4 is strongly clamped by the pair of pads 3 from both sides in the axial direction, and the vehicle is braked.

In particular, in the case of the present embodiment, with the radial mount type caliper 2 constituting the opposed piston type disc brake device 1, both ensuring rigidity and weight reduction can be achieved.

In the caliper 2 according to the present embodiment, the attachment boss portions 11a, 11b provided in the inner body 5 are coupled and fixed to the knuckle. Therefore, the caliper 2 tends to be elastically deformed such that the outer body 6 is separated from the inner body 5 in the axial direction at the time of braking. When the caliper 2 is elastically deformed in this manner, a tensile force in the axial direction tends to be applied to inner side portions of the rotation-in side bridge 7 and the rotation-out side bridge 8 in the radial direction, while a compressive force in the axial direction tends to be applied to outer side portions of the rotation-in side bridge 7 and the rotation-out side bridge 8 in the radial direction.

In the present embodiment, the concave portions 28 are formed in each of the rotation-in side bridge 7 and the rotation-out side bridge 8, so that the intermediate portion of each of the rotation-in side bridge 7 and the rotation-out side bridge 8 in the radial direction, on which both the tensile force in the axial direction and the compressive force in the axial direction are less likely to be applied at the time of braking, is formed in a hollow shape (thinned). Therefore, according to the caliper 2 of the present embodiment, the weight reduction can be achieved while a decrease in rigidity is suppressed.

In other words, the concave portion 28 includes the radial bottom portion 33 at the intermediate portion of each of the rotation-in side bridge 7 and the rotation-out side bridge 8 in the radial direction, instead of a through hole penetrating each of the rotation-in side bridge 7 and the rotation-out side bridge 8 in the radial direction. Therefore, by providing the concave portion 28, tensile rigidity of the rotation-in side bridge 7 and the rotation-out side bridge 8 in the axial direction is not reduced. Therefore, it is possible to achieve the weight reduction without reducing the tensile rigidity of the rotation-in side bridge 7 and the rotation-out side bridge 8 in the axial direction.

Further, the concave portion 28 includes the axial bottom portion 31 at the intermediate portion of each of the rotation-in side bridge 7 and the rotation-out side bridge 8 in the axial direction, instead of a through hole penetrating each of the rotation-in side bridge 7 and the rotation-out side bridge 8 in the axial direction. Therefore, by providing the concave portion 28, rigidity of outer side portions of the rotation-in side bridge 7 and the rotation-out side bridge 8 in the axial direction is not reduced.

The concave portions 28 are open on the outer surfaces of the rotation-in side bridge 7 and the rotation-out side bridge 8, and are also formed on the outer side portions of the rotation-in side bridge 7 and the rotation-out side bridge 8 in the radial direction. Therefore, providing the concave portion 28 is disadvantageous in terms of ensuring rigidity against the compressive force in the axial direction applied to the rotation-in side bridge 7 and the rotation-out side bridge 8. However, in the present embodiment, the first beam portion 29 and the second beam portion 30 are provided so as to sandwich the concave portion 28 from both sides, the end portions of the first beam portions 29 on the inner side in the axial direction are connected to the attachment boss portions 11a, 11b via the boss connecting portion 34, and the end portions of the second beam portions 30 on the inner side in the axial direction are directly connected to the attachment boss portions 11a, 11b.

The attachment boss portions 11a, 11b are portions that are coupled and fixed to the knuckle, and are portions that are less likely to be elastically deformed at the time of braking as compared with other portions of the caliper 2. Therefore, the end portions of the first beam portions 29 on the inner side in the axial direction and the end portions of the second beam portions 30 on the inner side in the axial direction can be suppressed from being displaced in the axial direction at the time of braking. Therefore, according to the caliper 2 of the present embodiment, since the compressive force in the axial direction applied to the rotation-in side bridge 7 and the rotation-out side bridge 8 can be effectively received by the first beam portions 29 and the second beam portions 30, rigidity of the rotation-in side bridge 7 and the rotation-out side bridge 8 in the axial direction can be sufficiently secured. As a result, according to the caliper 2 of the present embodiment, both ensuring the rigidity and the weight reduction can be achieved. That is, according to the present invention, it is possible to implement a caliper for an opposed piston type disc brake that is capable of achieving both ensuring rigidity and weight reduction.

Then, according to the caliper 2 of the present embodiment, the elastic deformation at the time of braking can be suppressed, and thus a desired braking force can be obtained by the opposed piston type disc brake device 1.

Further, the ridgelines $R_{29}$ of the first beam portions 29 are respectively connected to the end portions of the attachment boss portions 11a, 11b on the radially inner side via the ridgelines $R_{34}$ of the boss connecting portions 34, and the end portions of the second beam portions 30 on the inner side in the axial direction are directly connected to the end portions of the attachment boss portions 11a, 11b on the radially outer side. The end portions of the attachment boss portions 11a, 11b on the radially inner side and on the radially outer side are portions that are sandwiched in the radial direction between head portions of the bolts inserted through the bolt insertion holes 14a, 14b and the knuckle (or adapter), and are portions of the attachment boss portions 11a, 11b that are less likely to be elastically deformed at the time of braking. Therefore, the end portions of the first beam portions 29 on the inner side in the axial direction and the end portions of the second beam portions 30 on the inner side in the axial direction can be effectively suppressed from being displaced in the axial direction at the time of braking. Therefore, the rigidity of the rotation-in side bridge 7 and the rotation-out side bridge 8 in the axial direction can be sufficiently secured.

Further, the cross-sectional areas of the first beam portion 29 and the second beam portion 30 increase as extending toward the outer side in the axial direction. Therefore, second moments of area of the first beam portion 29 and the second beam portion 30 can be increased as approaching outer side portions of the first beam portion 29 and the second beam portion 30 in the axial direction, and thus, amounts of elastic deformation (amount of deflection) of the first beam portion 29 and the second beam portion 30 can be reduced. Therefore, the caliper 2 can be suppressed from being elastically deformed at the time of braking.

In addition, the circumferentially inward protruding portion 37 is provided at the inner side portion of the opening portion of the concave portion 28 in the circumferential direction, and the circumferentially outward protruding portion 38 is provided at the outer side portion of the opening portion of the concave portion 28 in the circumferential direction. Since the circumferentially inward protruding portion 37 and the circumferentially outward protruding portion 38 can be considered as a part of the first beam portion 29 and the second beam portion 30, cross-sectional areas at end portions of the first beam portion 29 and the second beam portion 30 on the radially outer side can be increased. Therefore, as compared with a case where the circumferentially inward protruding portion 37 and the circumferentially outward protruding portion 38 are not provided, the second moments of area of the first beam portion 29 and the second beam portion 30 can be increased, and the amounts of elastic deformation of the first beam portion 29 and the second beam portion 30 can be reduced.

In addition, the axially protruding portion 36 is provided at the outer side portion of the opening portion of the concave portion 28 in the axial direction. Accordingly, it is possible to increase rigidity, in the circumferential direction, of the outer side portions of the rotation-in side bridge 7 and the rotation-out side bridge 8 in the axial direction. Therefore, it is possible to suppress the outer side portions of the rotation-in side bridge 7 and the rotation-out side bridge 8 in the axial direction from being deformed in the circumferential direction. Further, the end portions of the axially protruding portion 36 on both sides in the circumferential direction are respectively connected to the end portion of the circumferentially inward protruding portion 37 on the inner side in the axial direction and the end portion of the circumferentially outward protruding portion 38 on the inner side in the axial direction. Therefore, the compressive force in the axial direction applied to the rotation-in side bridge 7 and the rotation-out side bridge 8 can be separately received by the first beam portion 29 and the second beam portion 30 through the axially protruding portion 36.

Further, in the present embodiment, two among the side ribs 15a, 15b, 16a, 16b are respectively disposed on the both outer side portions of the inner body 5 in the circumferential direction on the inner side surface of the inner body 5 in the axial direction to connect, in the circumferential direction, the attachment boss portions 11a, 11b and the inner side portions of the inner cylinder portions 10a, 10b in the axial direction. Therefore, it is possible to improve rigidity of the bottom portions 13a, 13b of the inner cylinder portions 10a, 10b in the axial direction. Therefore, at the time of braking, the bottom portions 13a, 13b of the inner cylinder portions 10a, 10b can be suppressed from being elastically deformed on the inner side in the axial direction, and the inner body 5 and the outer body 6 can be suppressed from being elastically deformed in directions separated from each other in the axial direction. In addition, since rigidity of the inner body 5 in the circumferential direction can be improved, the outer body 6 can be suppressed from being elastically deformed so as to be displaced in the circumferential direction (rotation direction of the rotor 4) with respect to the inner body 5 at the time of braking, and vibration and noise can also be suppressed.

The center rib 17 covers the bottom portions 13a, 13b of the inner cylinder portions 10a, 10b from the inner side in the axial direction. Therefore, the rigidity of the inner body 5 in the axial direction and the circumferential direction can be improved. In particular, the center rib 17 covers the intermediate portions of the bottom portions 13a, 13b of the inner cylinder portions 10a, 10b in the radial direction from the inner side in the axial direction so as to traverse the intermediate portions in the circumferential direction, and thus, at the time of braking, the bottom portions 13a, 13b of the inner cylinder portions 10a, 10b can be effectively suppressed from being elastically deformed on the inner side in the axial direction.

Further, the pair of side ribs 15a, 15b are disposed non-parallel to each other, the pair of the side ribs 16a, 16b are disposed non-parallel to each other, and the side ribs 15a, 15b, 16a, 16b respectively extend in the directions approaching the center axes $O_{10a}$, $O_{10b}$ of the inner cylinder portions 10a, 10b. Therefore, torsional rigidity of the inner body 5 can be improved.

Further, end portions of the side ribs 15a, 16a on the outer side in the circumferential direction are respectively connected to the end portions of the attachment boss portions 11a, 11b on the radially outer side, and end portions of the side ribs 15b, 16b on the outer side in the circumferential direction are respectively connected to the end portions of the attachment boss portions 11a, 11b on the radially inner side. Therefore, rigidity of the side ribs 15a, 15b, 16a, 16b can be improved. Accordingly, this is advantageous in improving the rigidity of the inner body 5.

Further, the main rib 25 provided on the outer side surface of the outer body 6 in the axial direction covers the intermediate portions of the bottom portions 23a, 23b of the respective outer cylinder portions 21a, 21b in the radial direction from the outer side in the axial direction so as to traverse the intermediate portions in the circumferential direction, and thus, at the time of braking, the bottom portions 23a, 23b of the outer cylinder portions 21a, 21b can be effectively suppressed from being elastically deformed on the outer side in the axial direction. The auxiliary rib 24 connects, in the circumferential direction, the rotation-out side bridge 8 and the outer cylinder portion 21b, and thus, rigidity of the outer cylinder portion 21b in the axial direction can be improved.

Although the embodiment of the present invention has been described above, the present invention is not limited thereto, and can be appropriately changed without departing from the technical concept of the invention.

In the embodiment, the case where the concave portion, the first beam portion, and the second beam portion are provided in each of the rotation-in side bridge and the rotation-out side bridge is described, but when the present invention is implemented, the concave portion, the first beam portion, and the second beam portion can be provided in any one of the rotation-in side bridge and the rotation-out side bridge.

In addition, in the embodiment, the case where the concave portion is open to the outer circumferential surface of the side bridge and the inner side surface of the side bridge in the axial direction is described, but when the present invention is implemented, an opening position of the concave portion is not particularly limited. For example, the concave portion can be open only to the outer circumferential surface of the side bridge or the outer side surface of the side bridge in the circumferential direction, or can be open to the outer circumferential surface of the side bridge and the outer side surface of the side bridge in the circumferential direction. When the concave portion is open only to the outer side surface of the side bridge in the circumferential direction, the first beam portion and the second beam portion are disposed in the radial direction with the concave portion sandwiched therebetween.

In addition, in the embodiment, the case where the end portions of the first beam portions on the inner side in the axial direction are connected to the end portions of the attachment boss portions on the radially inner side via the boss connecting portions is described, but when the present invention is implemented, the end portions of the first beam portions on the inner side in the axial direction can be directly connected to the end portions of the attachment boss portions on the radially inner side.

In the embodiment, the case in which the axially protruding portion, the circumferentially inward protruding portion, and the circumferentially outward protruding portion are respectively provided at the opening portion of the concave portion is described. However, when the present invention is implemented, the axially protruding portion, the circumferentially inward protruding portion, and the circumferentially outward protruding portion can be omitted. In addition, any one or two of the axially protruding portion, the circumferentially inward protruding portion, and the circumferentially outward protruding portion can be provided.

When the present invention is implemented, the caliper for the opposed piston type disc brake may have a monocoque structure (integral structure) integrally formed of a material such as an aluminum alloy, or may have a structure in which an inner side member and an outer side member are connected by bolts. The number of inner cylinder portions and the number of outer cylinder portions are not limited to two as described in the embodiment, and may be one or three or more.

What is claimed is:

1. A caliper for an opposed piston type disc brake comprising:
    an inner body disposed on an inner side of a rotor in an axial direction and including at least one inner cylinder portion and a pair of attachment boss portions disposed on both outer sides of the at least one inner cylinder portion in a circumferential direction, the pair of attachment boss portions each having a bolt insertion hole penetrating therethrough in a radial direction;
    an outer body disposed on an outer side of the rotor in the axial direction and including at least one outer cylinder portion; and
    a pair of side bridges disposed so as to cover the rotor from a radially outer side, and connecting, in the axial direction, end portions of the inner body on both outer sides in the circumferential direction and end portions of the outer body on both outer sides in the circumferential direction,
    wherein at least one of the pair of side bridges includes a concave portion extending in the axial direction and opening to an outer surface of the side bridge, and a first beam portion and a second beam portion disposed so as to sandwich the concave portion from both sides, end portions of the respective first beam portion and the second beam portion on the inner side in the axial direction being connected to the attachment boss portions directly or via portions of the side bridges located near the attachment boss portions,
    wherein the end portion of the first beam portion on the inner side in the axial direction is connected to the attachment boss portion via a boss connecting portion, and
    wherein the boss connecting portion constitutes an inner side portion of the side bridge in the axial direction.

2. The caliper for the opposed piston type disc brake according to claim 1,
    wherein the concave portion has an axial bottom portion at an end portion on the outer side in the axial direction.

3. The caliper for the opposed piston type disc brake according to claim 1,
    wherein the concave portion is open to an outer circumferential surface of the side bridge and/or an outer side surface of the side bridge in the circumferential direction.

4. The caliper for the opposed piston type disc brake according to claim 1,
wherein the concave portion is open to an inner side surface of the side bridge in the axial direction.

5. The caliper for the opposed piston type disc brake according to claim 1,
wherein a ridgeline of the first beam portion is connected to an end portion of at least one of the attachment boss portions on a radially inner side via a ridgeline of the portion of the side bridge located near the at least one of the attachment boss portions.

6. The caliper for the opposed piston type disc brake according to claim 1,
wherein the second beam portion is directly connected to an end portion of at least one of the attachment boss portions on the radially outer side.

7. The caliper for the opposed piston type disc brake according to claim 1,
wherein the first beam portion and the second beam portion are disposed in the circumferential direction with the concave portion sandwiched therebetween.

8. The caliper for the opposed piston type disc brake according to claim 1,
wherein at least one of the first beam portion and the second beam portion has a cross-sectional area that increases as extending toward the outer side in the axial direction.

9. The caliper for the opposed piston type disc brake according to claim 8,
wherein a circumferential width of the second beam portion increases as extending toward the outer side in the axial direction.

10. The caliper for the opposed piston type disc brake according to claim 8,
wherein a radial width of the first beam portion increases as extending toward the outer side in the axial direction.

11. The caliper for the opposed piston type disc brake according to claim 1,
wherein the side bridge further includes, at an opening portion of the concave portion, a protruding portion protruding in a direction in which an opening area of the concave portion decreases.

12. The caliper for the opposed piston type disc brake according to claim 11,
wherein the protruding portion is provided on an outer side portion of the opening portion of the concave portion in the axial direction.

13. The caliper for the opposed piston type disc brake according to claim 11,
wherein the protruding portion is provided on an inner side portion and/or an outer side portion of the opening portion of the concave portion in the circumferential direction.

14. The caliper for the opposed piston type disc brake according to claim 1,
wherein a center axis of the concave portion is inclined with respect to a center axis of the inner cylinder portion in a direction toward an inner side in the circumferential direction as extending toward the outer side in the axial direction.

* * * * *